United States Patent [19]

Mashio

[11] 4,391,242

[45] Jul. 5, 1983

[54] CONTROL DEVICE FOR AUXILIARY MEMBERS OF A VEHICLE

[75] Inventor: Sakae Mashio, Tatebayashi, Japan

[73] Assignee: Tama Manufacturing Co., Limited, Gumma, Japan

[21] Appl. No.: 265,359

[22] Filed: May 20, 1981

[30] Foreign Application Priority Data

May 23, 1980 [JP] Japan ............................. 55-68758

[51] Int. Cl.³ .................... F02D 11/08; B60H 3/04; F02B 77/00
[52] U.S. Cl. ........................ 123/198 R; 123/195 A; 123/198 D; 62/133; 62/213; 62/323.4
[58] Field of Search .......... 123/195 A, 198 R, 198 D; 62/213, 273, 133, 323

[56] References Cited

U.S. PATENT DOCUMENTS

| | | | |
|---|---|---|---|
| 3,606,764 | 9/1971 | Yokouchi et al. | 123/198 R |
| 3,692,007 | 9/1972 | Nilssen | 123/195 A X |
| 4,226,090 | 10/1980 | Horian | 123/198 R |
| 4,259,931 | 4/1981 | Clark | 123/198 R |
| 4,280,457 | 7/1981 | Bloxhan | 123/198 R |
| 4,312,311 | 1/1982 | Iwata | 123/198 R |

FOREIGN PATENT DOCUMENTS 55-59024  5/1980  Japan ............................. 123/198 R Primary Examiner—Wendell E. Burns
Attorney, Agent, or Firm—Toren, McGeady and Stanger

[57] ABSTRACT

The present invention relates to a control device for an auxiliary member of vehicles which is capable of suspending the driving of the auxiliary member of a vehicle such as a compressor for air conditioning device when there is a sudden increase of the load on the driving system of the vehicle and which is also capable of driving the auxiliary member as much as possible when the engine is operating below its maximum capacity. The control device comprises a means to detect the load of the driving system of a vehicle and the rate of acceleration of said load, a means to control the driving of an auxiliary member which is driven by the engine of the vehicle, and a means to transmit a signal to the driving mechanism of said auxiliary member to suspend its driving from the time when the acceleration of the load of the driving system of the vehicle exceeds a predetermined value until the time when the load returns to the predetermined value. It is, therefore, possible that according to the present invention, the auxiliary member driven by the engine may be automatically suspended when the load and its acceleration rate of the vehicle's driving system exceeds a predetermined value so that all of the power from the engine is used to run the vehicle. What is more, since the auxiliary member is constantly driven when the vehicle is under normal driving, unnecessary wear of the power switching mechanism, malfunctioning of the engine, abnormal vibration and the like may be avoided.

9 Claims, 2 Drawing Figures

CONTROL DEVICE FOR AUXILIARY MEMBERS OF A VEHICLE

BACKGROUND OF THE INVENTION

The present invention relates to a control device for an auxiliary member of a vehicle which is capable of suspending the auxiliary member alone when there is an abrupt increase of the load on the driving system of the vehicle and of driving said auxiliary member to a fuller capacity when the engine of the vehicle is operating below its maximum capacity.

The recent general trend in vehicles is that even small sized automobiles are equipped with air conditioning device for improving the comfort of the drivers or passengers. Such air conditioners of compact cars are generally operated by compressors driven by the vehicle's engine, and this reduces the allowance in the engine capacity. When the allowance in the engine capacity is low, the vehicle cannot obtain desired driving performance sufficient to climb a hill or take over another car and the fuel mileage also drastically decreases.

Such inconveniences can be avoided by suspending driving of the compressor temporarily when the load on the vehicle's engine system exceeds a predetermined level. However, driving of the compressor may be frequently suspended at the time of gear changing during the normal driving or for starting the engine, causing an abrupt change in the load applied on the engine. This not only leads to malfunctioning of the engine or abnormal vibration but may also cause abnormal wear of members such as clutches that are interposed between the engine and an auxiliary member (the compressor).

The present invention has been developed in consideration of such defects as above, and it aims to provide a device which enables the auxiliary member of a vehicle to drive constantly during the normal running but suspend temporarily when radically accelerating the speed or climbing a hill, in order to improve the running performance of the vehicle as well as to drive the auxiliary member constantly as much as possible.

DETAILED DESCRIPTION OF THE INVENTION

Figure 1:
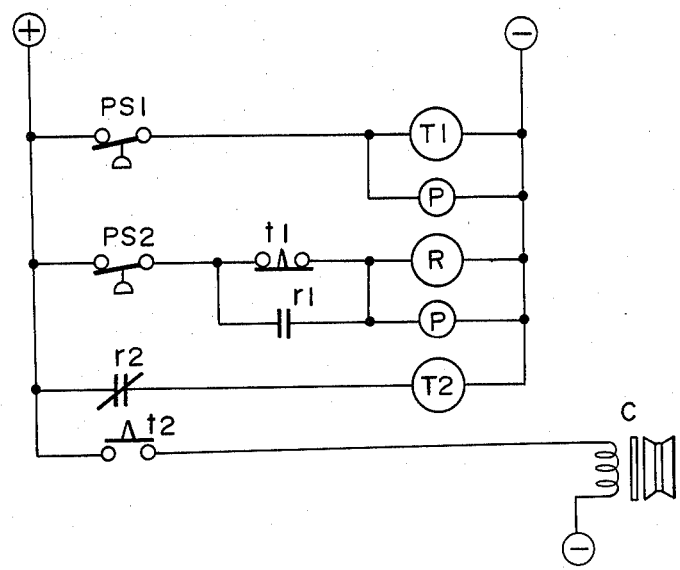
FIG. 1 illustrates the electric circuit of the control device embodiment according to the present invention, and, FIG. 2 shows the diagram indicating operational characteristics thereof.

The present invention will now be described with reference to the embodiment shown in the drawings.

The embodiment illustrated in the drawings is applied as a control device for the compressor of an air conditioning device. The first and the second negative pressure switches PS1 and PS2 are provided on the intake manifold (not shown). Here, the first negative pressure switch PS1 is switched ON only when the pressure inside the intake manifold (intake negative pressure) is lower than, for instance, -400 mmHg (approximately the atmospheric pressure) while the second negative pressure PS2 is switched ON only when the intake negative pressure is lower than, for instance, -50 mmHg. Both the negative pressure switches PS1 and PS2 are switched OFF when said intake negative pressure becomes higher than said respective operational levels.

A first timer T1 which is connected to the power source by way of said first negative switch PS1 renders the contact t1 which is normally closed to switch OFF in a predetermined time after the negative pressure switch PS1 is switched ON as well as renders said contact t1 to become ON again by switching OFF the first timer t1 as the first negative pressure switch PS1 is turned OFF.

A relay R which is connected to the power source by way of the second negative switch PS2 and the contact t1 of said first timer t1 is provided with a self-holding contact r1 which is connected serially to said contact t1 and which is normally opened and a contact r2 which is normally closed and which connects the second timer T2 with the power source. Therefore, when the second negative pressure PS2 is switched ON, the relay R is excited as the contact t1 of the first timer T1 is switched ON.

When said contact t1 is switched OFF, the relay R will not be excited.

The said second timer T2 on the other hand is provided with a contact t2 for connecting an electromagnetic clutch C which switches on and off the power transmitting system between the engine and the compressor (not shown) with the power source. The second timer T2 keeps the contact t2 turned ON while the contact r2 of said relay R is switched ON, and at the same time, it switches OFF the contact t2 instantaneously as the contact r2 of the relay R is switched OFF, switching OFF (suspending the operation of) the electromagnetic clutch C. After the contact r2 of the relay R is switched ON and a predetermined period of time passes, the contact t2 which is interposed between the electromagnetic clutch C and the power source is made to be switched ON again. Reference P denotes a pilot lamp.

With the structure as mentioned above, the intake negative pressure fluctuates in correspondence with the load of the engine as it is operated. As the load of the engine mainly comprises the load on the driving system of the vehicle, the magnitude and the acceleration rate of the load can be detected by means of the said negative pressure.

Figure 2:
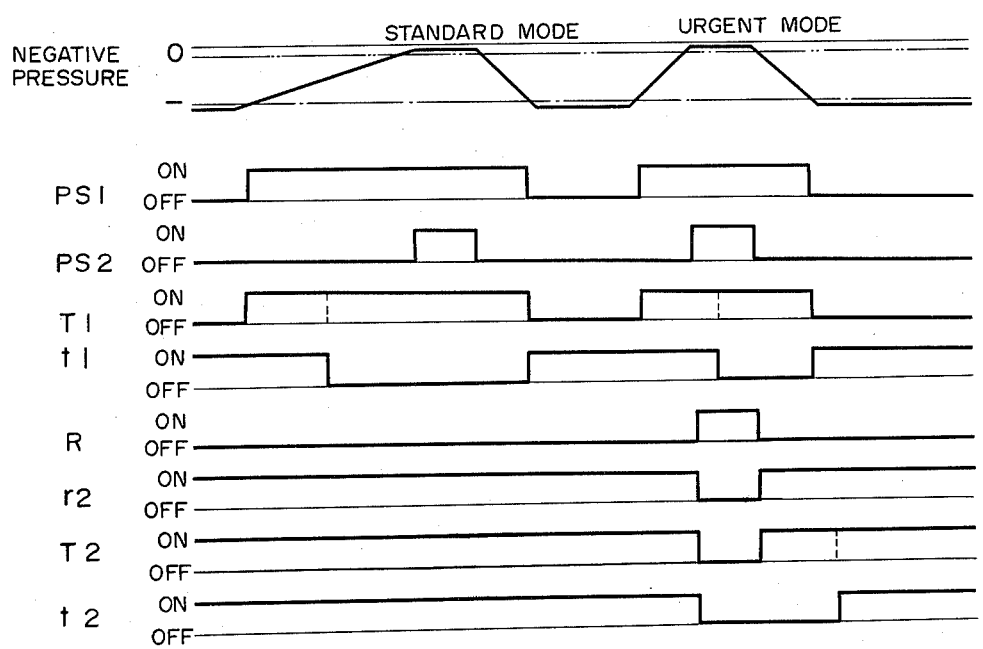

In other words, since the increase of the load caused by accelerating the normal driving or starting a vehicle is gradual, the reduction rate of the load is moderate as shown in the standard mode in FIG. 2.

Thus, the time length necessary for the intake negative pressure of the engine to reach from the operational level (indicated as a dot and dash line) of the first negative pressure switch PS1 to the operational level (indicated as a dot and dash line) of the second negative pressure switch PS2, or the time length from the time when the first negative pressure switch PS1 is switched ON until the second negative pressure switch PS2 is switched ON, becomes longer.

The relay R will therefore not be switched ON under the standard mode of acceleration as the first negative pressure switch PS1 is switched ON to switch on the timer T1, and after a predetermined period of time, the contact t1 thereof is switched OFF before the negative pressure switch PS2 is switched ON. As a result, the contact r2 of the relay R will be kept switched ON as well as the second timer T2, whereby the contact t2 thereof will also be kept switched on, rendering the electromagnetic clutch C to be kept excited and the compressor to be kept driving continuously.

The load on the driving system of a vehicle and its acceleration rate, on the other hand, will be greater when the vehicle is to be radically accelerated or climbs a steep slope. The negative pressure shows a radical drop at such times as is shown in the emergency mode in FIG. 2. As a result of this, the second negative pressure switch PS2 will be switched ON by the time when the first negative pressure switch PS1 is turned on to switch OFF the contact t1 of the first timer T1, whereby the relay R will be excited. The relay R will be self-maintained by means of the contact r1 thereof even if the contact t1 of the first timer T1 is switched OFF in a predetermined period of time after the first negative pressure switch PS1 is switched ON.

When the relay R is excited and the contact r2 is switched OFF, as described above, the second timer T2 will be switched OFF to cause the contact t2 thereof to be switched OFF. Under the emergency mode of operation, the contact t2 of the second timer T2 is switched OFF at the same time as the second negative pressure switch PS2 is switched ON, whereby the power supplied to the electromagnetic clutch C will be cut off to suspend the operation of the compressor. In this way the load on the engine can be reduced and the efficiency of acceleration may be improved.

When the negative pressure exceeds the second operational level due to acceleration of the engine, the second negative pressure switch PS2 will be switched OFF. The relay R will then be switched OFF, switching ON the contact r2 thereof. This renders the second timer T2 to be switched ON again. However, since the contact t2 of the second timer T2 will be switched ON again in a certain period of time after the timer T2 is switched ON, or, in other words, after the engine restores its normal operation, the compressor resumes to operate when there is sufficient allowance in the engine capacity.

By programming a suitable time for the first timer T1 and by selecting a suitable value for the first and second negative pressure switches PS1 and PS2 respectively, a desired driving performance can be maintained even when a greater power of the engine is required for radically accelerating the same to overtake another car or to climb a steep slope by suspending the operation of the compressor temporarily, which is otherwise kept driving under a normal acceleration for starting a vehicle, and under normal high speed running. This may prevent the decrease in the driving performance under the emergency mode of operation even if an automobile carrying an engine with a smaller allowance in the capacity is provided with an air conditioner of which compressor is driven by the engine of the vehicle.

In the embodiment described above, the load on the driving system and the acceleration rate thereof are detected by means of the intake negative pressure of the engine so that the power transmitting system which supplies the power to the auxiliary member (compressor) will be automatically cut off when the engine stops. It will therefore be unnecessary for the driver to manipulate for cutting the said transmitting system, as has conventionally been done, and the load on the starter motor which cranks the engine will be reduced, thereby improving the efficiency at the time of starting the engine. It goes without saying that the load of the engine and the acceleration rate thereof can also be detected by the degree and the rate by which the accelerating pedal is stepped on to control the load on the engine, VC negative pressure taken out from the throttle valve of the engine's carburetor, the degree to which the induction valve is opened, the flow of the fuel supply, or the operation of the power valve or accelerating pump provided on the carburetor.

As mentioned above, the present invention improves the operational efficiency, running performance and fuel mileage under the emergency mode as the auxiliary member which is driven by the engine is suspended automatically under the emergency mode when the load of the driving system and the acceleration rate thereof exceed a predetermined level, so that the engine output may be fully utilized for running. On the other hand, as the auxiliary member will be kept driving under the standard mode for normal operation, abnormal wear of the power switching mechanism, malfunctioning of the engine and abnormal vibration can be avoided.

What is claimed is:

1. A control apparatus for a vehicle-mounted auxiliary device to be driven by an engine, comprising:
   a pair of pressure switches to detect the load through the negative pressure intake of the engine;
   means to detect the rate of acceleration of the load by the difference in operation time between the pressure switches;
   control means to control the driving of said auxiliary device, and
   means to transmit a signal to the control means of said auxiliary device to suspend operation of the auxiliary device for the time period from when the acceleration rate of the load on the driving system of the vehicle exceeds a predetermined level until the time the load of the driving system of the vehicle returns to the predetermined level.

2. A control apparatus as in claim 1, wherein
   the pressure switches are connected in parallel; and said means to detect the rate of acceleration includes:
   a timer connected in series with one of the pressure switches,
   a normally closed contact of the timer connected in series with the other of the pressure switches,
   a relay in series with the contact and a normally open contact of the relay across the contact.

3. A control apparatus for a vehicle-mounted auxiliary device to be driven by an engine applying varying intake pressures, comprising:
   a first pressure switch responsive to a first pressure;
   a second pressure switch responsive to an engine pressure different from the first pressure;
   sensing means for detecting the time difference between operation of the first switch and the second switch;
   control means for controlling the operation of the auxiliary device, and
   means for transmitting a disabling signal to the control means when the time difference between operation of the first pressure switch and the second pressure switch is less than a predetermined time difference and for transmitting an enabling signal only after the pressure releases one of said switches.

4. An apparatus as in claim 3, wherein
   said transmitting means transmits the enabling signal a predetermined time after the operation of one of said pressure switches has ended.

5. An apparatus as in claim 3, wherein said sensing means includes a timer for sensing that said switches have closed within a predetermined time period.
6. An apparatus as in claim 5, wherein
said sensing means includes means for latching the timer in response to said second pressure switch.
7. An apparatus as in claim 4, wherein
said sensing means includes a timer for sensing that said switches have closed within a predetermined time period.
8. An apparatus as in claim 3, wherein
said sensing means includes a timer connected in series with said first pressure switch,
a contact in series with said second pressure switch, and
a relay in series with said timer contact and said second pressure switch as well as a relay contact shunted across said second pressure switch; and
said transmitting means includes a second relay contact as well as a second timer in series with said second relay contact switch;
said series arrangement of said second timer and said relay contact being connected in parallel with said series arrangement of said relay and said timer contact as well as said second pressure switch and also in parallel with said first timer and said first pressure switch.
9. An apparatus as in any one of claims 1 to 8, wherein each of said pressure switches is arranged to operate at pressures less negative than the lowest negative pressure of the engine intake.

* * * * *